(12) United States Patent  (10) Patent No.: US 7,578,233 B2
Acker, Jr.  (45) Date of Patent: Aug. 25, 2009

(54) CULINARY HAND PRESS AND METHODS FOR USE

(75) Inventor: Phillip F. Acker, Jr., 505 Edinburgh St., San Mateo, CA (US) 94402

(73) Assignee: Phillip F. Acker, Jr., San Mateo, CA (US)

( * ) Notice: Subject to any disclaimer, the term of this patent is extended or adjusted under 35 U.S.C. 154(b) by 373 days.

(21) Appl. No.: 11/594,526

(22) Filed: Nov. 7, 2006

(65) Prior Publication Data

US 2007/0119314 A1    May 31, 2007

Related U.S. Application Data

(60) Provisional application No. 60/739,660, filed on Nov. 25, 2005.

(51) Int. Cl.
*B02C 15/00* (2006.01)
*B30B 9/04* (2006.01)

(52) U.S. Cl. .............. 99/510; 99/504; 99/505; 100/110; 100/112; 100/125; 100/130; 100/243; 100/116

(58) Field of Classification Search .................. 99/510, 99/504, 505; 100/126, 234, 110, 112, 125, 100/130, 243, 116
See application file for complete search history.

(56) References Cited

FOREIGN PATENT DOCUMENTS

WO    2005087063    *    9/2005

* cited by examiner

*Primary Examiner*—Shawntina Fuqua

(57) ABSTRACT

A hand press includes a body, a movable handle and a hinge pivotally coupling a proximal end of the movable handle to the body. The body includes a pressing container having one or more side walls and a bottom and a ratchet mechanism. The ratchet mechanism includes a plunger shaft, a plunger coupled to a first end of the plunger shaft, a driver engaging the plunger shaft and an actuator link coupled between the movable handle and the driver. The plunger forms a top of the pressing container. A method for pressing items using the hand press is also disclosed.

21 Claims, 8 Drawing Sheets

CULINARY HAND PRESS AND METHODS FOR USE

CROSS REFERENCE TO RELATED APPLICATIONS

This application claims priority from U.S. Provisional Patent Application No. 60/739,660 filed on Nov. 25, 2005 and entitled "Ratcheted Culinary Hand Press," which is incorporated herein by reference in its entirety.

BACKGROUND

The present invention relates generally to methods and systems of pressing or crushing, and more particularly, to methods and systems for pressing or crushing a small item primarily using hand pressure.

Many different types of hand food presses have been designed and built over the years to crush garlic. FIG. 1 shows a typical hand food press 100. The typical hand food press 100 has a clamshell design, with two handles 102A and 102B pinned together at one end with a hinge pin 104. Typically, these devices have a crushing container 106 molded into the lower handle 102B. A plunger 108 presses the contents of the crushing container 106 against the strainer 110.

The upper handle 102A has the plunger 108 attached to it. As the upper handle 102A approaches the lower handle 102B, the plunger 108 descends into the crushing container 106, squeezing the contents against the strainer 110. As the contents are crushed, any liquid can drain through holes in the strainer 110.

These presses 100 are often designed for single-handed operation. The mechanical advantage of these presses 100 is derived from the moments of the upper handle 102A and lower handle's 102B lever actions. With many possibilities for crushing and pressing (e.g., garlic, nuts, some fruits, or other items to be crushed or pressed), the required crushing force can often exceed the amount of force a user is easily and/or comfortably capable of exerting with a single hand. As a result, users often resort to using both hands in order to crush the contents of the crushing container 106. In some cases, the user may be unable to exert the force needed to crush the contents of the crushing container 106, even with two hands.

Other attempts to solve this problem include rotary crushing devices and a rotational ratcheting hand press. The rotary crushing devices can be difficult for people with weak wrists to turn, especially when wet. The design of the rotational ratcheting hand press has multiple pinch points that can cause injury.

In view of the foregoing, there is a need for a safer, more easily usable single hand press.

SUMMARY

Broadly speaking, the present invention fills these needs by providing an improved hand press and methods for using the hand press. It should be appreciated that the present invention can be implemented in numerous ways, including as a process, an apparatus, a system, or a device. Several inventive embodiments of the present invention are described below.

One embodiment provides a hand press that includes a body, a movable handle and a hinge pivotally coupling a proximal end of the movable handle to the body. The body includes a pressing container having one or more side walls and a bottom and a ratchet mechanism. The ratchet mechanism includes a plunger shaft, a plunger coupled to a first end of the plunger shaft, a driver engaging the plunger shaft and an actuator link coupled between the movable handle and the driver. The plunger forms a top of the pressing container.

The pressing container can be removable from the body. The bottom of the pressing container can include at least one hole. The ratchet mechanism can also include a return spring coupled to the plunger shaft. The bottom of the pressing container can be removable.

The plunger shaft and the pressing container can be substantially longitudinally aligned with the handle. Alternatively, the plunger shaft and the pressing container form an angle with the handle. The angle can be between about 0 and about 90 degrees.

The plunger shaft can also include teeth longitudinally arranged on the plunger shaft and wherein the lever engages the teeth in the plunger shaft. The driver can frictionally engage the plunger shaft.

The driver can also include a release tab and the link can include a release prong. The release prong is capable of engaging the release tab such that the driver disengages the plunger shaft. The driver can rotatably engage the plunger shaft and the release prong can be capable of engaging the release tab such that the driver is rotated until the driver disengages the plunger shaft.

Another embodiment provides a hand press including a body, a movable handle and a hinge pivotally coupling a proximal end of the movable handle to the body. The body includes a pressing container and a ratchet mechanism. The pressing container includes one or more side walls and a bottom. The bottom is removable and includes at least one hole. The pressing container can also be removable from the body. The ratchet mechanism includes a plunger shaft, a plunger coupled to a first end of the plunger shaft. The plunger forms a top of the pressing container. A driver engaging the plunger shaft and an actuator link coupled between the movable handle and the driver.

Still another embodiment provides a method of pressing an item in a hand press including opening a pressing container in a body of the hand press, placing the item in the pressing container, closing the pressing container, depressing and releasing a movable handle of the hand press multiple times. Each time the movable handle is depressed and released it ratchetably advances the plunger from an initial position to a subsequent position further into the pressing container, thereby pressing the item between the plunger and a bottom of the pressing container.

The method can also include returning the plunger to the initial position. The ratchet mechanism can include a return spring coupled to the plunger shaft. The method can also include releasing a latch on the plunger shaft and allowing the return spring to return the plunger to the initial position.

The pressing container can be removable from the body and wherein closing the pressing container can include securing the pressing container to the body. The pressing container can include at least one hole and at least a portion of the item to be pressed can be pressed through the at least one hole.

The pressing container is removable and replaceable. Closing the pressing container can include securing the bottom of the pressing container in the pressing container. The method can also include replacing the bottom of the pressing container with a different bottom.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for a hand press and methods for using the hand press will now be described. It will be apparent to those skilled in the art that the present invention may be practiced without some or all of the specific details set forth herein.

The hand press described herein provides a mechanical advantage thereby substantially reducing the effort required to press the desired item being pressed. By way of example, a garlic clove can be difficult to press due to the hardness of the garlic clove. The mechanical advantage provided herein multiplies the effort input to the hand press, thereby easing the pressing or crushing of the garlic clove.

One embodiment of the hand press makes crushing items easier by using the mechanical advantage of a linear ratchet mechanism to drive a pressing plunger into the item to be pressed. The item to be pressed is contained within a pressing container. The pressing container can be opened and the item to be pressed is placed within the pressing container. As the handles of the hand press are squeezed together, the ratchet mechanism incrementally drives the plunger into the item to be pressed. At least one side of the pressing container, typically the side opposing the plunger (e.g. the bottom), includes one or more holes (e.g., a strainer). The plunger incrementally presses the item to be pressed against the strainer and at least a portion of the item (e.g., crushed pieces, pulp and/or fluid) is pressed through the strainer. After each time the handles are squeezed together, a first handle returns to its initial starting position, which moves the ratchet mechanism farther down the plunger shaft.

The first handle can also be rotated past the initial starting position to disengage the ratchet mechanism from the plunger's shaft. A plunger return spring can move the plunger back to its initial starting position.

Figure 1:
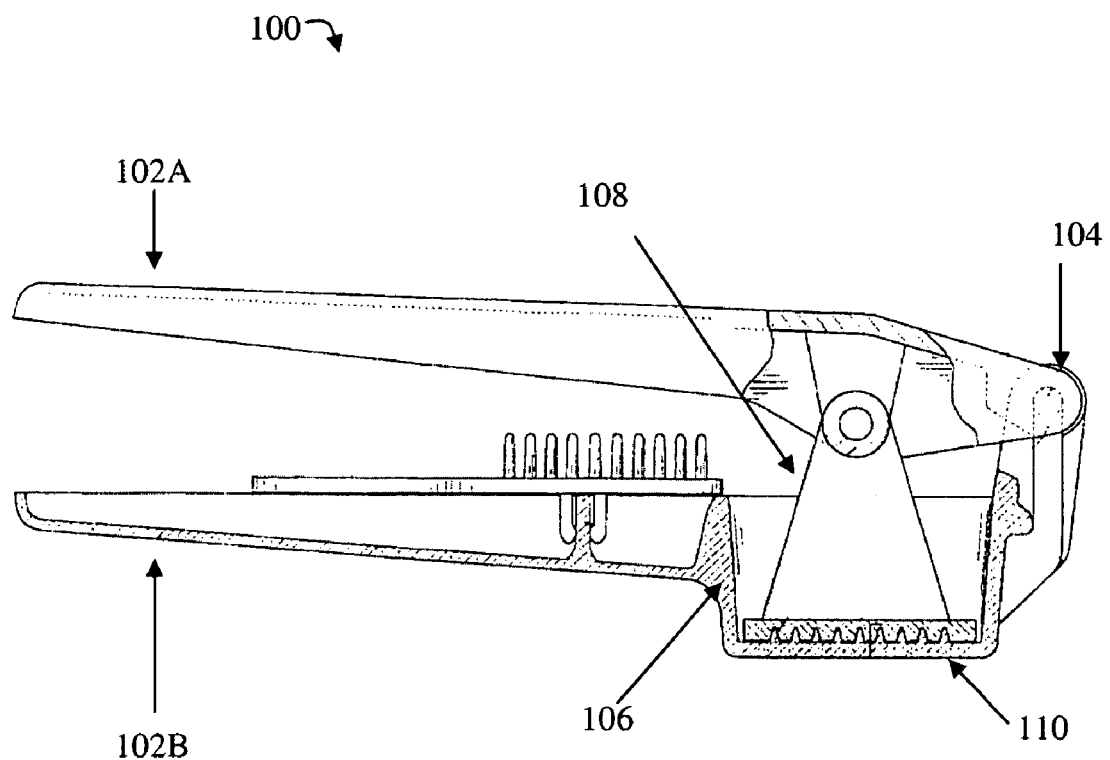
FIG. 1 shows a typical hand food press 100.
Figure 2:
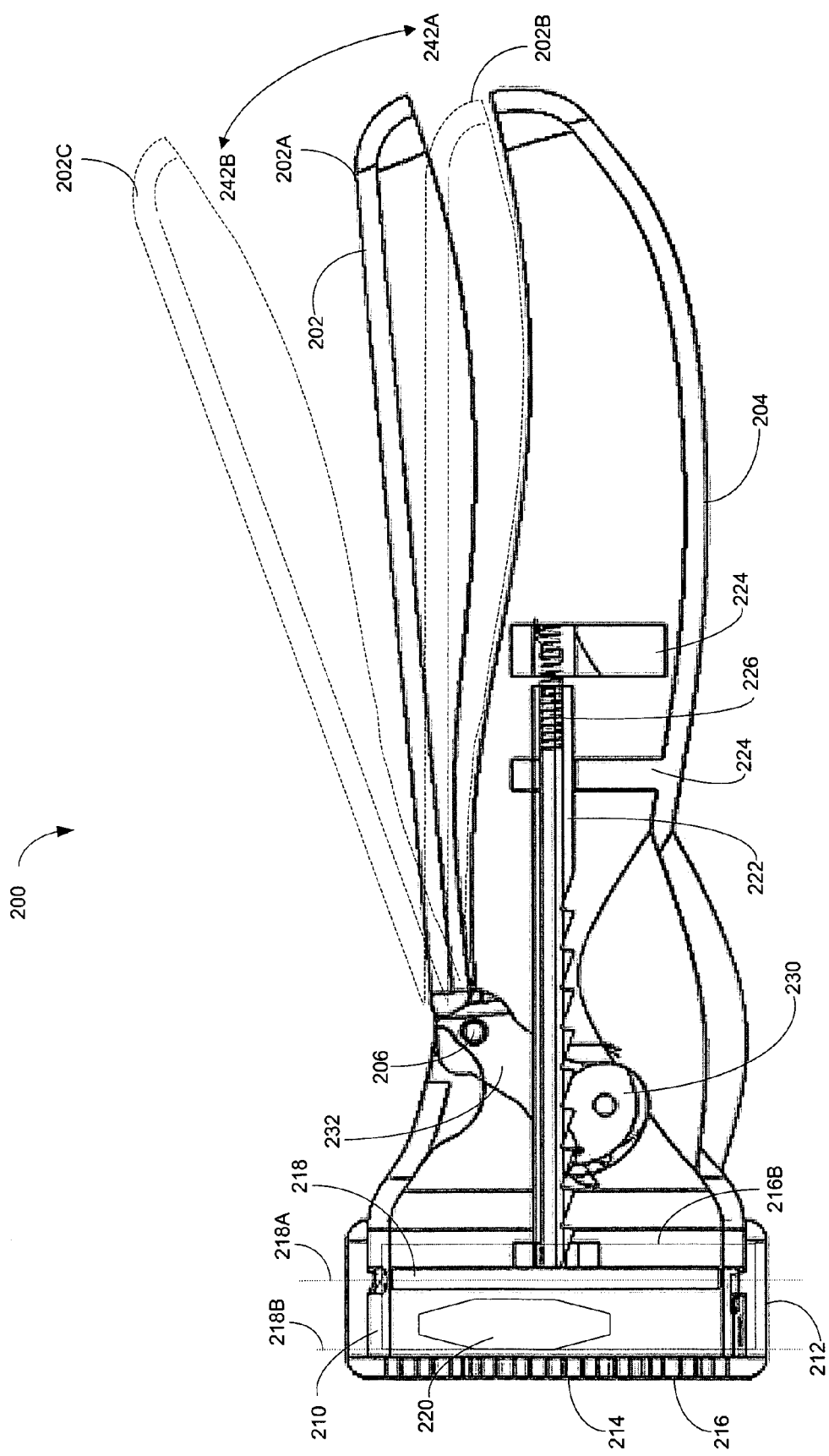
FIG. 2 is a cutaway view of a hand press, in accordance with an embodiment of the present invention.
Figure 3:
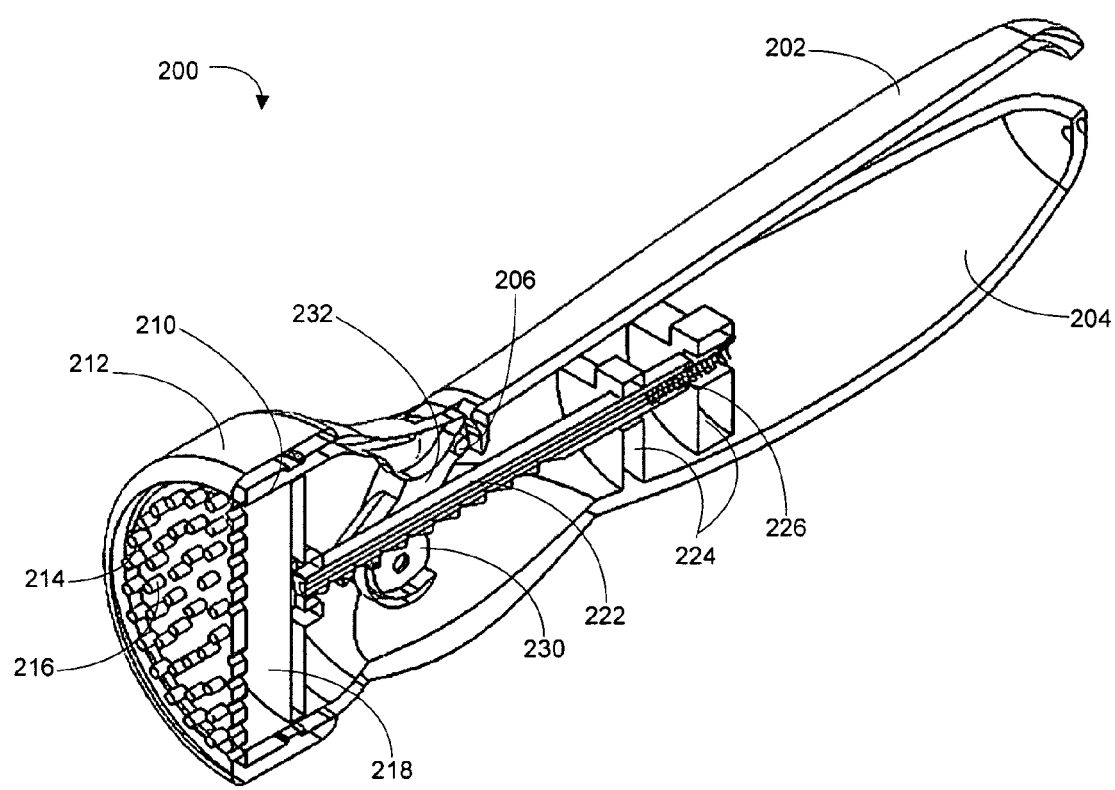
FIG. 3 is a perspective view of the hand press, in accordance with an embodiment of the present invention.
Figure 4:
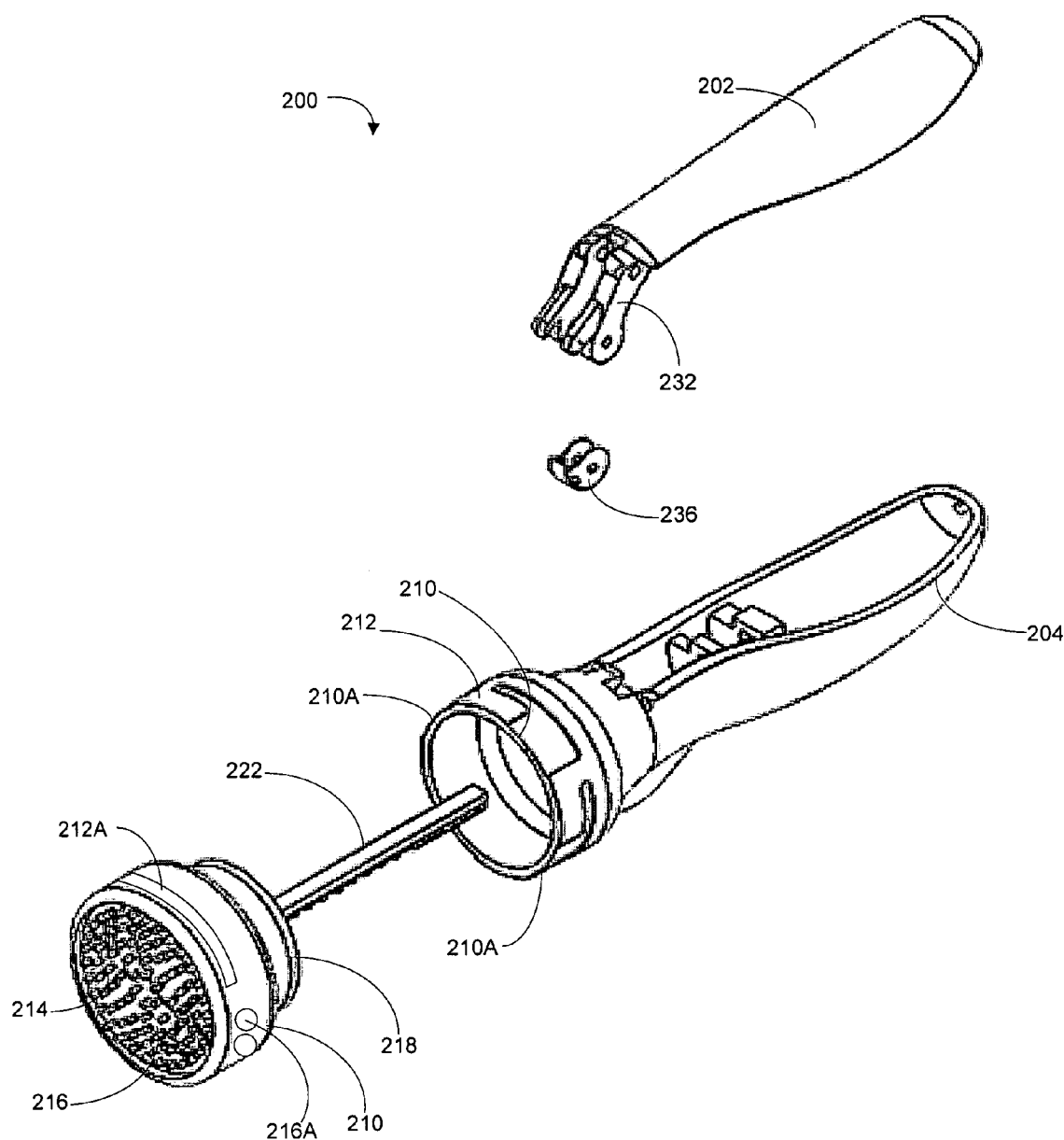
FIG. 4 is an exploded view of the hand press, in accordance with an embodiment of the present invention.

FIG. 2 is a cutaway view of a hand press 200, in accordance with an embodiment of the present invention. FIG. 3 is a perspective view of the hand press 200, in accordance with an embodiment of the present invention. FIG. 4 is an exploded view of the hand press 200, in accordance with an embodiment of the present invention. Referring now to FIGS. 2-4, the hand press 200 includes a handle 202, a body 204, a pressing container 210 and a ratchet 230. The handle 202 is pivotally coupled to the body 204 with a hinge pin 206. The pressing container 210 is also coupled to or included as part of the body 204. By way of example, the pressing container 210 and the body 204 can be molded in a single piece. The pressing container 210 or at least a portion thereof can be removable from the body 204.

The pressing container 210 can include a cap 212 that includes a strainer 214. The strainer 214 can include at least one hole 216 or slits or other apertures for straining or otherwise allowing a portion of the item being pressed 220 and/or the liquid from the item being pressed to escape from the pressing container 210 as the item is pressed. The strainer 214 can be detachably connected to the pressing container 210. The strainer 214 can be exchanged for a different strainer. By way of example a first strainer can include no holes so that a pressed item remains fully contained within the pressing container 210. Alternatively, a second strainer can include multiple small holes 216 allowing small pieces and juice (e.g., pulp from pressing an orange) to flow from the pressing container 210. Alternatively, a third strainer 214 can include one or more holes 216 that are bounded by cutting edges so that the strainer cuts or dices the item 220.

The strainer 214 can be removed (e.g., by removing the cap 212) so as to open the pressing container 210 and allow the item 220 to be placed in the pressing container. The cap 212 can also include a slot 212A in at least one side. The strainer 214 can be inserted or removed by sliding through the slot 212A in the side of the cap 212.

Alternatively, the cap 212 can be fixed and non-removable. The cap 212 can include an opening 216A. Alternatively, the cap 212 can rotate to close opening 216A. The opening 216A can be closed by a sleeve on the outside of the cap 212. The opening 216A can allow the strainer to be placed in the cap 212 and allow the item 220 to be placed in the pressing container 210. In yet another alternative, the strainer 214 can rotate or pivot into a position to allow the item 220 to be placed in the pressing container 210.

The pressing container 210 can have any suitable shape. By way of example, the pressing container 210 is shown in an approximately circular shape, alternatively, the pressing container can be elliptical, rectangular, hexagonal, etc.

The hand press 200 also includes a plunger 218. The plunger 218 forms one side of the pressing container 210. By way of example the pressing container 210 includes side walls 210A, the strainer 214 forms a first end of the pressing container and the plunger 218 forms an opposing end of the pressing container. It should be understood that the plunger 218 and the holes 216 are not required to be on opposing sides of the pressing container 210. By way of example, the strainer 218 could be solid (i.e., without any holes 216) and the holes 216A could additionally or alternatively be included in the cap 212 or body 204.

The plunger 218 is coupled to a plunger shaft 222. The plunger shaft 222 can be substantially perpendicular to the plunger 218 as shown. However, it should be understood that a lever (not shown) could be coupled between the plunger shaft 222 and the plunger 218, thereby allowing the plunger shaft to be substantially non-perpendicular to the plunger. The plunger shaft 222 can be substantially aligned linearly with the body 204. The plunger shaft 222 is supported by a track or at least one support 224 inside of the body 204. As will be described in more detail in FIG. 6 below, the plunger shaft 222 can also form a selected angle with the body 204.

The plunger shaft 222 can also be coupled to a return spring 226. The return spring 226 provides a spring in tension (or in compression, as shown in more detail in FIG. 8 below) to automatically return the plunger 218 from an extended position 218B to a starting position 218A. When the plunger 218 is in the starting position 218A, the space inside a pressing container 210 is maximized. As the handle 202 is pressed to the body 204, the ratchet 230 drives the plunger shaft 222 and the plunger 218 into the pressing container 210. The item 220 is then pressed between the plunger 218 and the strainer 214.

Figure 5:
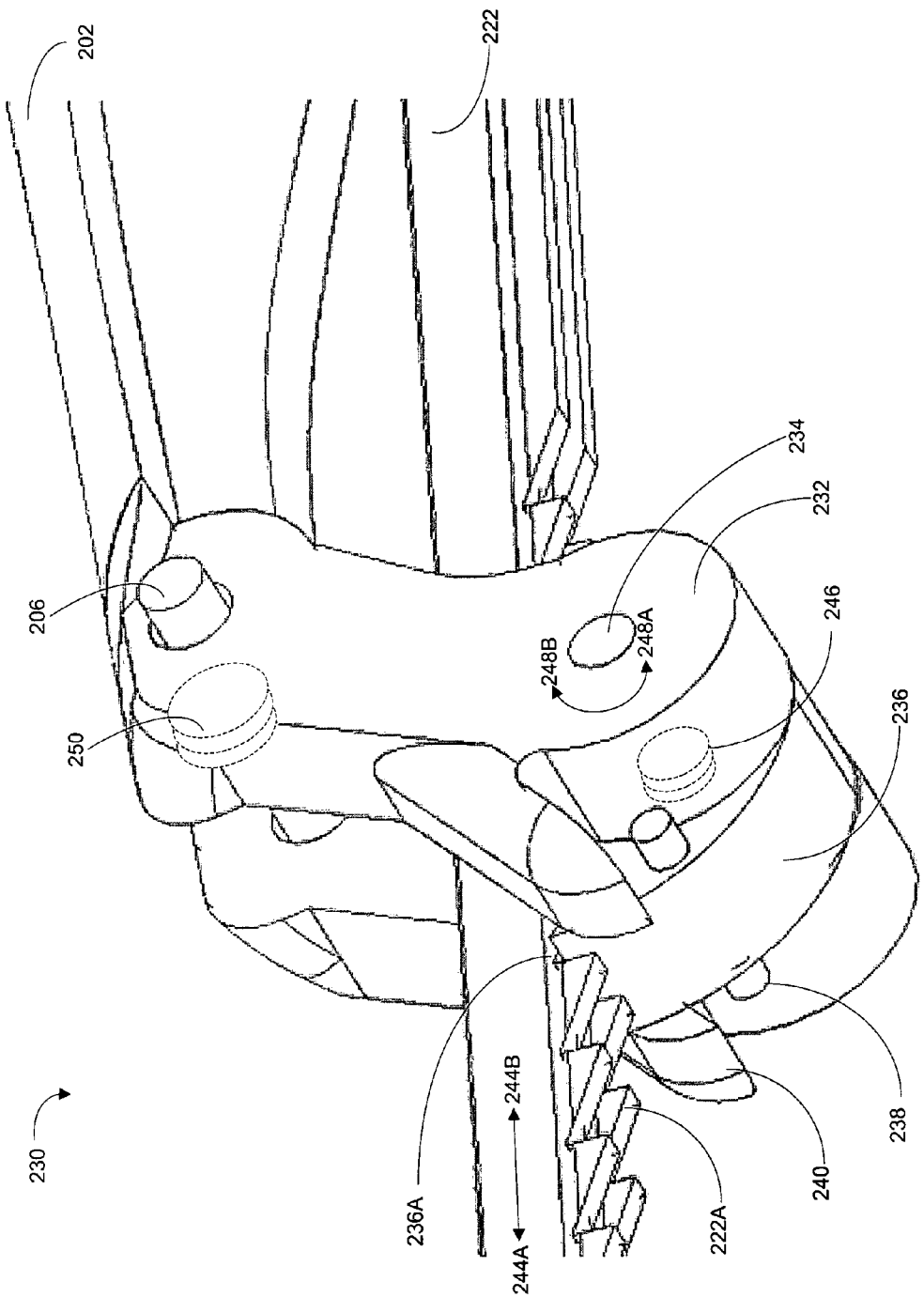
FIG. 5 is a detailed view of the ratchet, in accordance with an embodiment of the present invention.

FIG. 5 is a detailed view of the ratchet 230, in accordance with an embodiment of the present invention. The ratchet 230 is coupled to a proximal end of the handle 202 near the hinge pin 206. The ratchet 230 includes a link 232, a ratchet pin 234, a driver 236, a release tab 238 and a release prong 240. The plunger shaft 222 can include teeth 222A in at least one embodiment.

The handle 202 pivots about the body 204 on the hinge pin 206 through an initial position 202A, a pressed position 202B and a release position 202C. The link 232 extends past the hinge pin 206 to the plunger shaft 222. The driver 236 is coupled to the link by a driver pin 234. As the handle 202 is moved in direction 242A toward the body 204, and into the pressed position 202B, the handle pivots on hinge pin 206 and moves the link 232 and the driver 236 in direction 244A. The driver 236 is engaged in the plunger shaft 222 (e.g., either by engaging the teeth 222A or by friction with the surface of plunger shaft 222) and pushes the plunger shaft in direction 244A and advances the plunger shaft in direction 244A and thereby advancing the plunger 218 into the pressing container 210.

As the handle 202 is moved in direction 242B (i.e., away from body 204) to the initial position 202A, the handle pivots on hinge pin 206 and moves the link 232 and the driver 236 in direction 242B. As the driver 236 moves in direction 244B, the driver disengages the plunger shaft 222. The driver 236 slides down the plunger shaft 244B to engage the plunger shaft 222 in a different location preceding the previously engaged location on the plunger shaft (e.g., a different tooth 222A preceding the previously engaged tooth on the plunger shaft). A spring 246 applies a spring load on the driver 236 in direction 248B to maintain the leading edge 236A of the driver in contact with the plunger shaft 222.

The plunger 218 is returned to the initial position 218A by disengaging the driver 236 from the plunger shaft 222. By way of example, the handle 202 is moved in direction 242B to the release position 202C, pivoting on hinge pin 206 and moving link 232 in direction 244B until the release prong 240 engages the release tab 238. When the release prong 240 engages the release tab 238, the driver 236 rotates in direction 248A, around driver pin 234, until the edge 236A of the driver is separated from the plunger shaft 222. If the plunger shaft 222 includes optional teeth 222A, then the driver 236 is rotated in direction 248A, around driver pin 234, until the edge 236A of the driver is fully disengaged from the teeth 222A on the plunger shaft 222. When the edge 236A of the driver is separated from the plunger shaft 222, the plunger shaft return spring 226 pulls the plunger shaft in direction 244A. Pulling the plunger shaft in direction 244A also pulls the plunger 218 to the initial position 218A.

The handle 202 can be returned to the initial position 202A automatically through use of a mechanical device including a handle return spring 250, a counter balance, or other suitable mechanism. The handle 202 can also or alternatively be manually returned to the initial position 202A.

Figure 6:
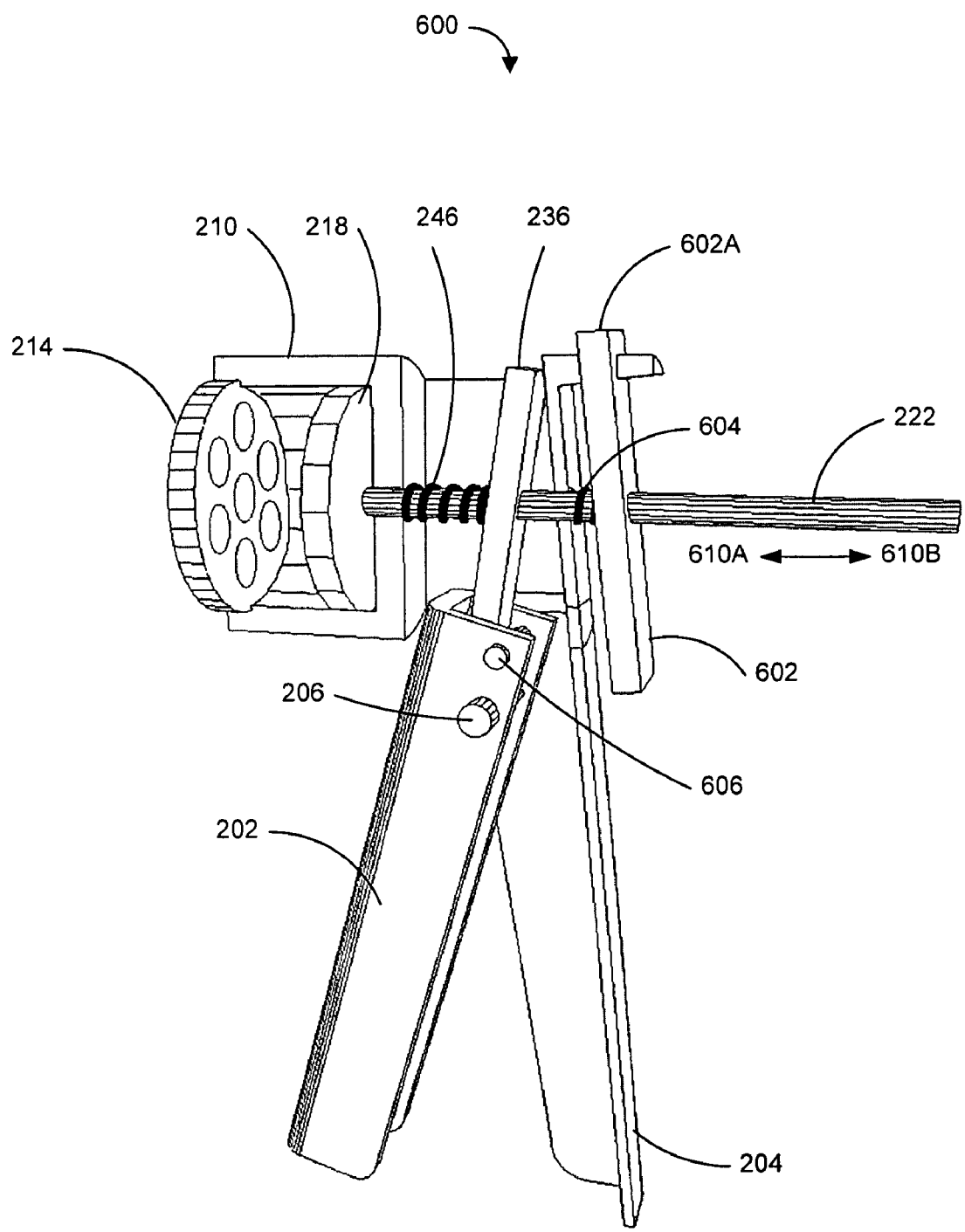
FIG. 6 is a partial cutaway view of a hand press, in accordance with an embodiment of the present invention.

FIG. 6 is a partial cutaway view of a hand press 600, in accordance with an embodiment of the present invention. The plunger 218 line of action 610A, 610B is substantially perpendicular to the handle 202 and the body 204. The plunger shaft 222 is substantially smooth (i.e., without dedicated teeth for the driver 232 to engage). The driver spring 246 and a driver pin 606 press a driver 236 into the plunger shaft 222, so that the driver can engage the plunger shaft by friction. When the handle 202 is squeezed toward the body 204, the driver 236 pushes the plunger shaft 222 and the plunger 218 into the pressing container 210 toward the strainer 218, the handle 202 rotates about hinge pin 206 and the driver pin 606 pulls the driver 236. As the driver pin 606 pulls the driver 236, the driver pushes the plunger shaft 222 and the plunger 218 into the pressing container 210 toward the strainer 218 and in the direction of 610A.

A release lever spring 604 maintains pressure on a release lever 602. The release lever 602 pivots from one end 602A and engages the plunger shaft 222 with friction. The release lever 602 prevents the plunger shaft 222 from slipping when the driver 236 disengages the plunger shaft 222 after each press of the handle 202, as it is driven into the pressing container 210. When the release lever 602 is pressed, the friction between the plunger shaft 222 and the release lever 602 is removed. When the friction between the plunger shaft 222 and the release lever 602 is removed, a return spring (not shown) returns the plunger 218 to its initial position. Alternatively, the plunger shaft 222 can be manually pulled back to its initial position.

Figure 7:
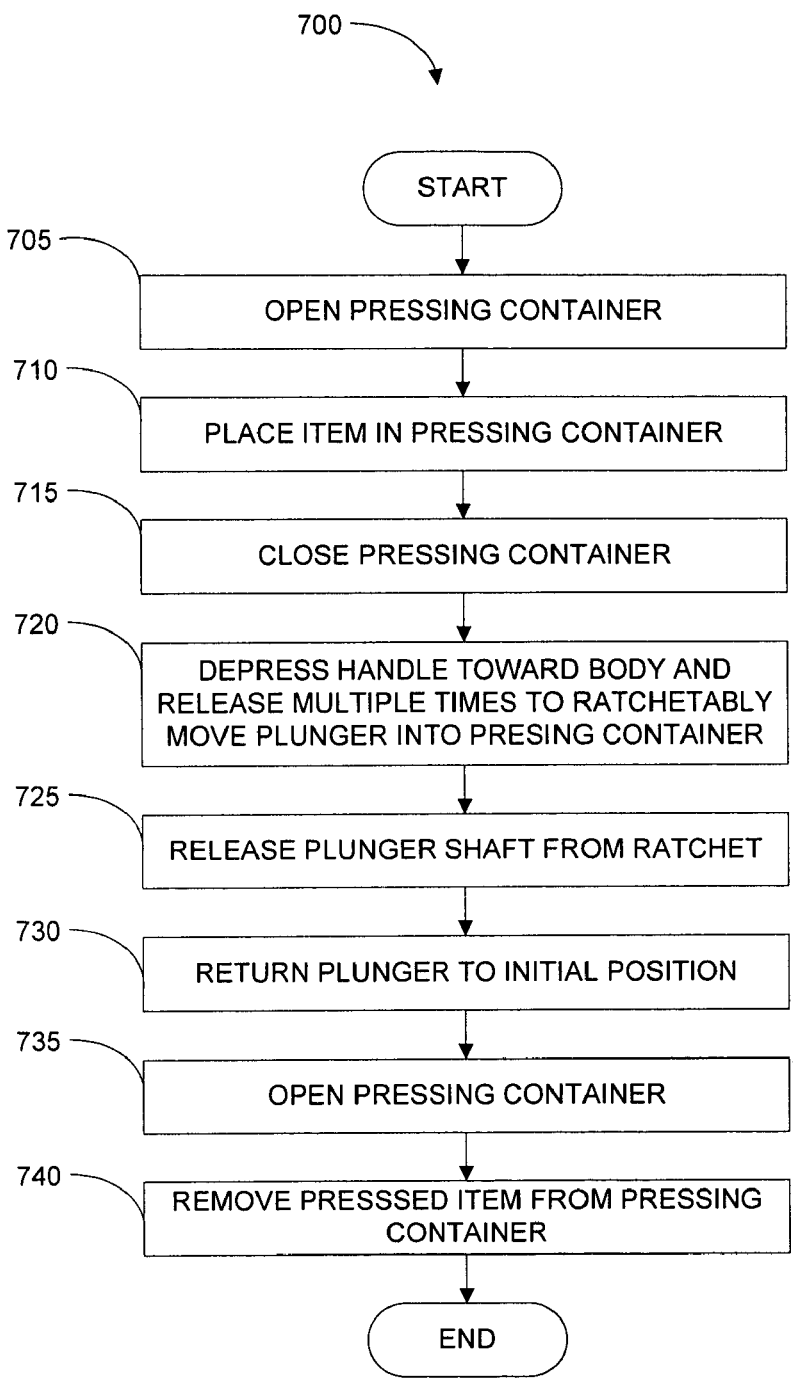
FIG. 7 is a flowchart diagram that illustrates the method operations performed in using a hand press, in accordance with one embodiment of the present invention.

FIG. 7 is a flowchart diagram that illustrates the method operations 700 performed in using a hand press 200, in accordance with one embodiment of the present invention. The pressing container 210 is opened in an operation 705. The pressing container 210 can be opened in any of the manners described above. In an operation 710, the item 220 is placed in the pressing container 210.

In an operation 715, the pressing container 210 is closed and in operation 720, the handle 202 is depressed toward the body 204 and released multiple times. Each time the handle 202 is depressed and released, the plunger 218 is ratchetably pressed or moved from the initial position to a subsequent position into the pressing container 210. As a result, the item 220 is pressed between the plunger 218 and an opposing side or bottom (e.g., the strainer 214) of the pressing container 210.

In an operation 725, the ratchet 230 is released and the plunger 218 returns to the initial position 218A in an operation 730. The ratchet 230 can be released by disengaging the driver from the plunger shaft 222 and allowing the plunger 218 to return to the initial position 218A. The plunger 218 can be returned to the initial position 218A by a plunger return spring 226. Alternatively, the plunger 218 can be returned to the initial position 218A by manually returning the plunger to the initial position.

The pressing container 210 can be opened in an operation 735. The pressed item can be removed in an operation 740 and the method operations can end.

Figure 8:
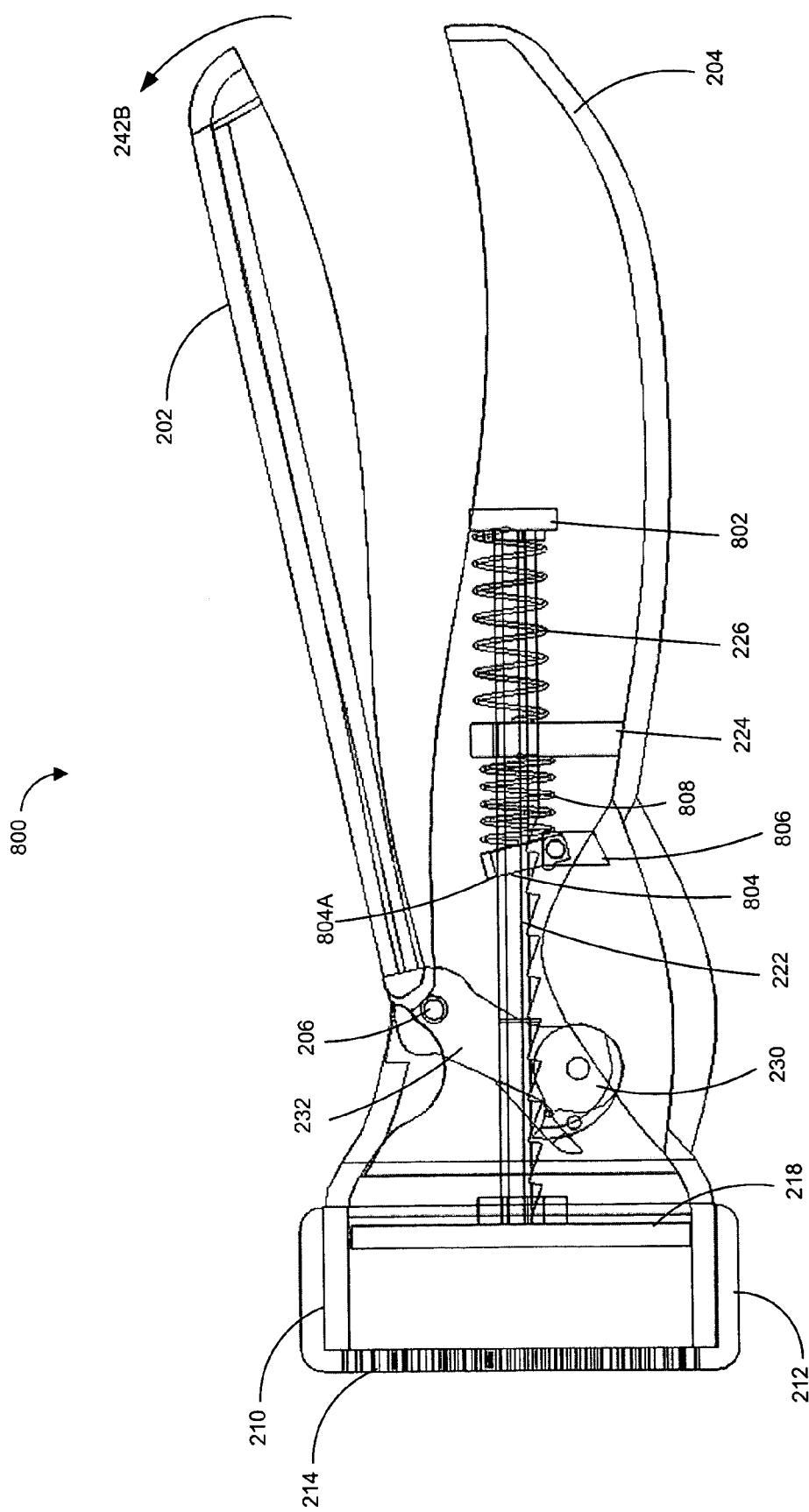
FIG. 8 is a cutaway view of a hand press, in accordance with an embodiment of the present invention.

FIG. 8 is a cutaway view of a hand press 600, in accordance with an embodiment of the present invention. The hand press 800 includes a handle 202, a body 204, a pressing container 210 and a ratchet 230. The handle 202 is pivotally coupled to the body 204 with a hinge pin 206. A plunger 218 is coupled to a plunger shaft 222 which is driven by the ratchet 230. A return spring 226 compresses between support 224 and a plate 802 coupled to plunger shaft 222. The plate 802 can be coupled to the plunger shaft 222 at the opposite end of the plunger shaft 222 from plunger 218. Plate 802 can be a nut, a washer, a clip, a pin, a plate bonded or welded to the plunger shaft 222 or any other suitable stop for the spring 226.

Return spring will apply a return force to plunger 218. Additionally, an item 220 placed in pressing container 210 can also have some elasticity as the item is being compressed between plunger 218 and strainer 214. As a result when the handle 202 returns to its initial position, the plunger 218 and the plunger shaft 222 may slip. One approach to minimize or even eliminate the slippage includes a brake 804 that is coupled to body 204. The coupling can use a pivot or hinge pin at an optional structure 806. A brake spring 808 between support 224 and at brake 804 can apply a force that increases friction contact between brake 804 and plunger shaft 222 at point 804A. The frictional contact can be sufficient to prevent plunger shaft 222 from slipping when ratchet mechanism 230 disengages from plunger shaft 222.

The brake 804 can be disengaged by rotating the handle 202 in direction 242B, until link 232 engages brake 804. The handle 202 can rotate more than 90 degrees to cause the link 232 to engage the brake 804. Link 232 disengages brake 804 from plunger shaft 222 and the return spring 226 moves the plunger 218 to its initial position. It should be noted that brake 804 may alternatively be coupled to a support, such as support 224 instead of body 204.

In alternate embodiments, the teeth 222A on plunger shaft 222 may take many forms. There may be one tooth or multiple teeth 222A in each row. The teeth 222A may extend on the entire circumference of the plunger shaft 222, or the teeth may be located on only one or more side of the plunger shaft. The teeth 222A may be of any shape, such as triangular, square, round, etc. The teeth 222A may be oriented in rows or spiral around the plunger shaft 222. The plunger shaft 222 may be round, square, rectangular, or any other shape.

As used herein in connection with the description of the invention, the term "about" means +/-10%. By way of example, the phrase "about 250" indicates a range of between 225 and 275. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A hand press comprising:
a body;
a movable handle; and
a hinge pivotally coupling a proximal end of the movable handle to the body, the body including:
a pressing container having one or more side walls and a bottom; and
a ratchet mechanism having:
a plunger shaft;
a plunger coupled to a first end of the plunger shaft, the plunger forming a top of the pressing container;
a driver engaging the plunger shaft; and
an actuator link coupled between the movable handle and the driver.

2. The hand press of claim 1, wherein at least a portion of the pressing container is removable from the body.

3. The hand press of claim 1, wherein the bottom of the pressing container includes at least one hole.

4. The hand press of claim 1, wherein the ratchet mechanism further includes a return spring coupled to the plunger shaft.

5. The hand press of claim 1, wherein the bottom of the pressing container is removable.

6. The hand press of claim 1, wherein the plunger shaft and the pressing container are substantially longitudinally aligned with the handle.

7. The hand press of claim 1, wherein the plunger shaft and the pressing container form an angle with the handle, where the angle is between about 0 and about 90 degrees.

8. The hand press of claim 1, wherein the plunger shaft includes teeth longitudinally arranged on the plunger shaft and wherein the lever engages the teeth in the plunger shaft.

9. The hand press of claim 1, wherein the driver frictionally engages the plunger shaft.

10. The hand press of claim 1, wherein the driver includes a release tab and wherein the link includes a release prong, wherein the release prong is capable of engaging the release tab such that the driver disengages the plunger shaft.

11. The hand press of claim 10, wherein the driver rotatably engages the plunger shaft and the release prong is capable of engaging the release tab such that the driver is rotated until the driver disengages the plunger shaft.

12. A hand press comprising:
a body;
a movable handle; and
a hinge pivotally coupling a proximal end of the movable handle to the body, the body including:
a pressing container having one or more side walls, a bottom, and a cap wherein the bottom is removable and includes at least one hole wherein at least a portion of the pressing container is removable from the body; and
a ratchet mechanism having:
a plunger shaft;
a plunger coupled to a first end of the plunger shaft, the plunger forming a top of the pressing container;
a driver engaging the plunger shaft; and
an actuator link coupled between the movable handle and the driver.

13. A method of pressing an item in a hand press comprising:
opening a pressing container in a body of the hand press;
placing the item in the pressing container;
closing the pressing container;
depressing and releasing a movable handle of the hand press a plurality of times, each one of the plurality of times the movable handle is depressed and released ratchetably presses the plunger from an initial position to a subsequent position further into the pressing container, thereby pressing the item between the plunger and a bottom of the pressing container.

14. The method of claim 13, further comprising returning the plunger to the initial position.

15. The method of claim 14, wherein the ratchet mechanism includes a return spring coupled to the plunger shaft.

16. The method of claim 15, further comprising releasing a latch on the plunger shaft and allowing the return spring to return the plunger to the initial position.

17. The method of claim 13, wherein the pressing container is removable from the body and wherein closing the pressing container includes securing the pressing container to the body.

18. The method of claim 13, wherein the pressing container includes at least one hole and wherein at least a portion of the item to be pressed is pressed through the at least one hole.

19. The method of claim 13, further comprising removing the bottom of the pressing container.

20. The method of claim 19, wherein closing the pressing container includes securing the bottom of the pressing container to the pressing container.

21. The method of claim 19, further comprising, replacing the bottom of the pressing container with a different bottom.

* * * * *